United States Patent [19]

Neal et al.

[11] 3,876,071

[45] Apr. 8, 1975

[54] STORAGE CONTAINER FOR TAPE CASSETTE WITH SELF-LOCKING SPRING TO PREVENT TAPE SPILLAGE

[75] Inventors: Lloyd D. Neal, Redwood City; Allan R. Northrup, Cupertino, both of Calif.

[73] Assignee: Amaray International Corporation, Cupertino, Calif.

[22] Filed: Apr. 22, 1974

[21] Appl. No.: 462,741

[52] U.S. Cl. ................ 206/387; 206/493; 242/200; 220/337

[51] Int. Cl. ............................................ B65d 85/67

[58] Field of Search ........... 206/387, 389, 405, 408, 206/493, 1.5; 220/337; 242/200

[56] References Cited

UNITED STATES PATENTS

| | | | |
|---|---|---|---|
| 3,272,325 | 9/1966 | Schoenmaker et al. | 206/387 |
| 3,307,689 | 3/1967 | Lyman | 206/405 |
| 3,550,983 | 12/1970 | Probst | 242/200 |
| 3,587,841 | 6/1971 | Devejian | 206/387 |
| 3,739,998 | 6/1973 | Esashi et al. | 242/200 |

*Primary Examiner*—William T. Dixson, Jr.
*Attorney, Agent, or Firm*—Schatzel & Hamrick

[57] ABSTRACT

A storage container for storing a tape cassette is disclosed. The storage container comprises an enclosure and a pair of cylindrical bosses for engaging the hubs of respective reels which carry the magnetic tape of the associated cassette. The bosses include a button for engaging a drive-hole in the hub, and a spring for urging the button into a locking position when the cassette is placed within the container and the drive-hole is aligned with the button. This arrangement limits lateral and rotational movement of the reels so as to prevent the tape from unwinding while the cassette is enclosed within the container. In a preferred embodiment, the two bosses protrude inwardly and are integrally formed with one of the sides of the enclosure, and the button and the spring are integrally formed in a cap that mates with the bosses. The entire storage container is preferably injection molded from polypropylene.

10 Claims, 6 Drawing Figures

STORAGE CONTAINER FOR TAPE CASSETTE WITH SELF-LOCKING SPRING TO PREVENT TAPE SPILLAGE

BACKGROUND OF THE INVENTION

1. Field of the Invention

This invention relates to a storage container for storing a magnetic tape cassette and in particular, to such a container that includes a self-locking mechanism which limits lateral and rotational movement of the tape reel so as to prevent the tape from unwinding while the cassette is enclosed within the container.

2. Description of the Prior Art

Today tape cassettes housing one or more reels of magnetic tape are used for storing information. For example, tape cassettes are used to house video, audio and computer tapes. To protect the cassette so as to minimize the risk of losing the stored information and to provide a means of storing or shipping the cassettes, it is quite common for the tape cassettes to be stored within storage containers.

Heretofore, none of the containers for storing video tape cassettes has been suitably constructed to prevent the magnetic tape from unwinding and spilling off its reels during storage.

It should be noted that the reels on which the magnetic tape is stored are able to freely rotate and move laterally between the side walls of the cassette housing. Thus, as the cassette is subjected to vibrations, such as occur during handling and shipping, the reel rotates and moves laterally, which consequently causes the tape to unwind. When a tape unwinds, the unwound portion of tape extends outside the protective covers of the cassette, and, quite often tends to become balled-up or crumpled between the cassette and the storage container. Generally, when this occurs, the information stored on that portion of the tape is lost.

An example of a storage container that is on the market is one that includes a pair of cylindrical bosses which extend inwardly from one of the sides of the container in a manner so as to engage respective hubs from within the cylindrical recesses in the associated tape cassette. Because of the cumulative tolerances associated with the manufacture of the storage container and of the tape cassette, frictional engagement has not been achieved between the bosses and the hubs. It should be recognized that a frictional fit would be almost impossible to achieve since the tape cassettes have no positive registration surface and since the precise location and size of the recesses and other cassette dimensions varies with manufacturer. In addition, since frictional fits are positive in nature, the cassette would have to be forced over the bosses, and accordingly would be extremely difficult to remove. As a result, storage containers having cylindrical bosses alone are unable to prevent the reel from rotating, and consequently the tape from unraveling during storage.

OBJECT OF THE INVENTION

It is therefore an object of the present invention to provide a storage container which prevents the stored magnetic tape from unwinding off its associated reel, so as to preclude the possibility of the tape crumpling and becoming ruined.

Another object of the invention is to provide such a storage container which includes a hub-locking feature which prevents tape spillage.

Still another object of the present invention is to provide a storage container which is simply fabricated from a single material.

SUMMARY OF THE PRESENT INVENTION

Briefly, the present invention is directed to a storage container for storing a tape cassette. The tape cassette is one of a type which includes opposed first and second walls for housing a reel of magnetic tape such that the reel is laterally and rotatably movable therebetween, whereby lateral and rotational movement of the reel causes the tape to unwind. The reel comprises a hub which includes a bottom wall and a cylindrical side wall that define a cylindrical recess therewithin, the bottom wall including a central locating hole for receiving a locating pin which protrudes inwardly from the second wall for roughly positioning the reel in the cassette and a plurality of drive holes disposed between the locating hole and the side wall, the first wall including a circular opening therethrough that exposes the recess. The storage container comprises an enclosure for enclosing the cassette, which includes a first wall having a flat, planar inner surface and a pair of hub engaging cylinders affixed to the inner surface and protruding inwardly therefrom for engaging portions of the bottom wall and the side wall of the respective hubs, each hub engaging cylinder including a spring-retaining recess beneath its top surface and having an outer diameter that is slightly less than that of the side wall and a height such that its top surface abuts the bottom wall when the first wall of the cassette is placed against the inner surface. A spring assembly is carried by each of the hub engaging cylinders, the spring assembly including a button, that is adapted to be received by the drive holes, and a spring member. The button is movable between a recessed position wherein the button lies within the spring-retaining recess and a locking position wherein the button extends above the top surface. In operation, when the cassette is placed within the container and one of the drive holes is aligned with the button, the spring member urges the button into the locking position within the aligned drive hole, thereby limiting lateral and rotational movement of the reel so as to prevent the tape from unwinding while the cassette is enclosed within the container.

An advantage of the storage container of the present invention is that it self-locks the reels of the stored tape cassette to prevent rotational or lateral movement thereof, thereby to preclude tape spillage.

Another advantage of this invention is that it is fabricated from plastic materials which facilitates manufacturing and precludes problems associated with intermixing metals and plastics.

Still another advantage of this invention is that the tape storage enclosure is able to accommodate the cassette in either of two orientations.

Other objects and advantages will be apparent to those skilled in the art after having read the following detailed disclosure which makes reference to the several figures of the drawings.

IN THE DRAWING

DETAILED DESCRIPTION OF THE PREFERRED EMBODIMENT

Figure 1:
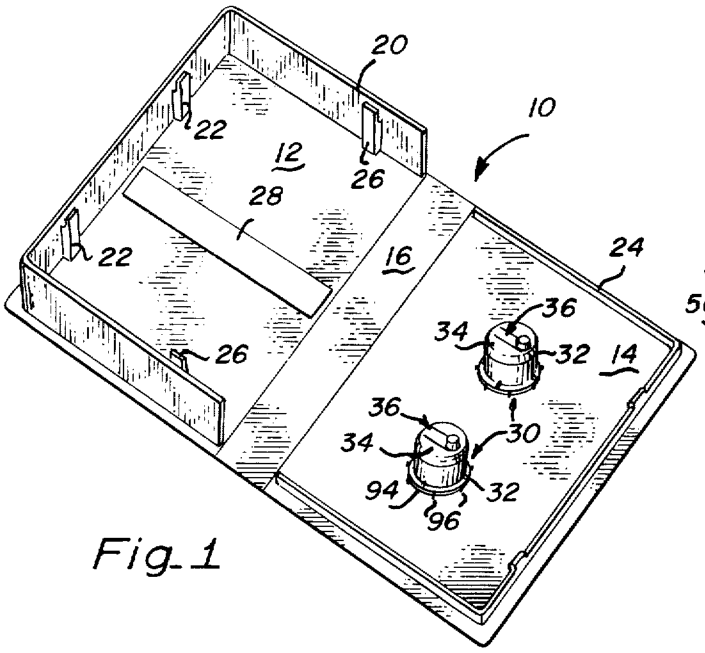
FIG. 1 is a perspective view of the storage container of the present invention.

The storage container for storing tape cassettes in accordance with the present invention is illustrated in perspective view in FIG. 1. As shown therein, the storage container comprises an integral hinged box-like enclosure, generally designated by the numeral 10, which is shaped to receive a tape cassette therein. The enclosure 10 includes a top wall 12 and a bottom wall 14 which are joined together by a hinge 16. Depending inwardly from the inner surface of the top wall, along three edges thereof, is a side wall 20. A pair of keeper assemblies 22 are carried by the side wall 20 for engaging a small rib 24, which extends along the exposed periphery of the bottom wall 14, in a latching arrangement. A pair of guides 26 are carried by the portions of the side wall 20 adjacent the portion carrying the keepers 22 for engaging the rib 24 and for strengthening the side walls 20. The ends of a thin clear plastic strap 28 are each sealed to the top wall 12 and serve to secure paper memos, such as an instruction sheet, within the storage container. When the box is opened, the inner surfaces of the top and bottom walls provide a flat, planar cassette-receiving surface.

In accordance with this invention, a pair of cylindrical hub-engaging members 30 depend inwardly from the central region of the inner surface of the bottom wall 14. The hub-engaging members 30 include a cylindrical base portion 32 and a cap 34. The cap carries a spring means 36 which co-acts with the tape cassette in a manner which will be subsequently described to limit lateral and rotational movement of the associated reel so as to prevent the tape from unwinding while the cassette is enclosed within the container.

Figure 2:
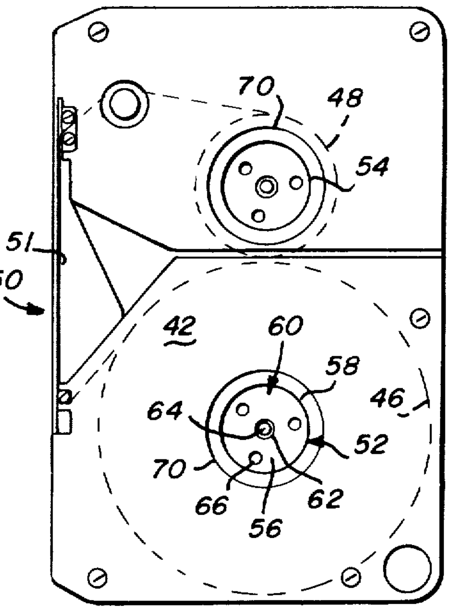
FIG. 2 is a side elevational view of the type of tape cassette that is to be stored by the storage container of the present invention.
Figure 3:
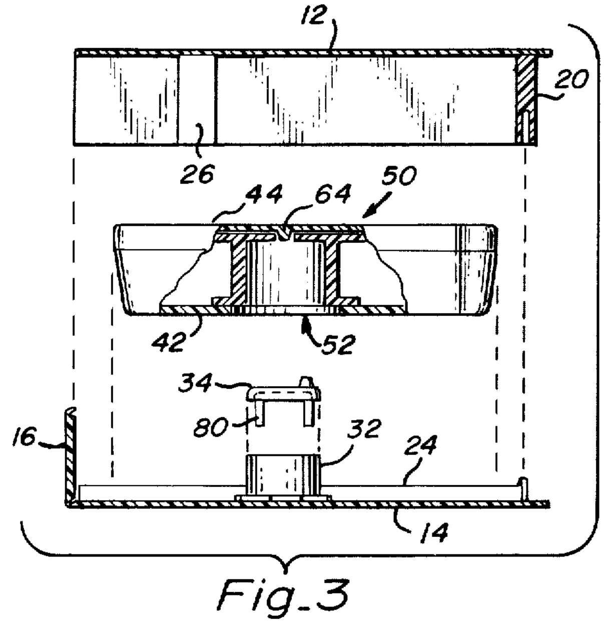
FIG. 3 is an exploded view of the tape cassette of FIG. 2 enclosed by the storage container of the present invention.

Referring to FIGS. 2 and 3, the tape cassette, which is to be stored within the container of the present invention, is illustrated. The tape cassette is a substantially rectangular plastic container having opposed first and second walls 42 and 44. A storage reel 46 and a take-up reel 48 serve to contain a length of magnetic tape 51 therearound in a manner well-known in the industry. Accordingly, as the tape is wound from the storage reel to the take-up reel during record or playback operations, it passes through an opening in the cassette, generally designated by the numeral 50 where the information stored thereon is recorded, or read, by the appropriate electronics and magnetic transducer assembly (not shown).

Hubs 52 and 54 comprise the center portion of the reels 46 and 48 respectively. The hubs include a bottom wall 56 and a cylindrical side wall 58 that define a cylindrical recess, generally designated by the numeral 60, therewithin. The bottom wall 56 includes a central locating hole 62 for receiving a locating pin 64 which protrudes inwardly from the second wall 44 of the tape cassette. The locating pin 64 serves to roughly position the reel within the cassette. In addition, three drive holes 66 are disposed through the bottom wall 56 between the locating hole 62 and the side wall 58. The centers of the drive holes 66 lie on a circle having its center at the geometric center of the bottom wall such that the three drive holes are equally spaced apart and separated by 120°. Circular openings 70 are disposed through the first wall 42 so as to expose the cylindrical recesses of the respective hubs so as to enable the hubs to be engaged and driven by an appropriate tape drive mechanism (not shown). In a preferred embodiment, the tape cassette is one manufactured by the Sony Corporation that holds three-fourths inch wide magnetic tape and which is designated by them as the U-Matic Cassette.

Figure 5:
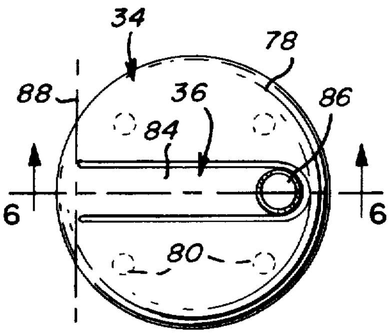
FIG. 5 is a plan view of the top surface of the hub engaging means of the present invention illustrating the novel spring mechanism which prevents the tape from unwinding.
Figure 4:
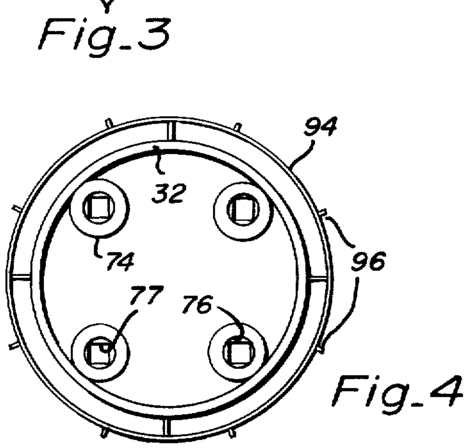
FIG. 4 is a plan view of the cylindrical base of one of the hub engaging means of the present invention.
Figure 6:
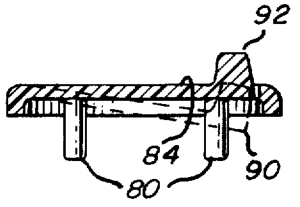
FIG. 6 is a cross-sectional view through the lines 6—6 of FIG. 5.

Referring now to FIGS. 3–6, the novel hub-locking feature carried by the hub engaging means is shown in several views. With reference to FIGS. 4 and 5, the cylindrical hub engaging means includes a thin annular base 32 which includes four supports 74 that are disposed near the inner periphery of the base. The central open region between the supports defines a spring-retaining recess. The supports 74 are annular in shape so as to expose apertures 76. Within the exterior of the supports 74, the lower portion has a square cross-section, as at 77, and the upper portion has a circular cross-section, defined by aperture 76, of a larger area than the lower square 77. The cap 78 includes four elongated members 80 which depend outwardly from the cap and which are located so as to be receivable by respective ones of the apertured supports 74 in the base. This enables the elongated members 80, which are circular in cross-section, to be securely held within the base when the cap is snapped into position. In accordance with the present invention, a spring means, generally designated by the numeral 36 is carried by the cap 34. The spring means 36 includes a leaf spring member 84 having a button 86 secured to its distal end and is pivotal about an axis 88 which is formed where the leaf spring joins the cap. Accordingly, the button 86 is movable between a recessed position, wherein the button lies within the spring-retaining recess formed within the base 32 between the supports 74, and a locking position, wherein the button extends flush with, or above, the top surface of the cap. The recessed position is best illustrated by the dashed lines 90 of FIG. 6 and the locking position is best illustrated by solid line 92 in FIG. 6. It should be noted that the spring member 84 serves to continuously urge the button 86 into the locking position.

In positioning the tape cassette in the container, the cassette is placed within the enclosure in an orientation such that the cylindrical recesses of the hubs are inserted over the respective hub-engaging cylinders. In this manner the top surface of the cap abuts the bottom wall of the hub and the cylindrical side walls of the hub are either in contact or slightly out of contact with a corresponding surface of the base 32. The height of the side walls are such that the first wall 42 of the cassette lies in contact with, or is slightly spaced from, the inner surface of the bottom wall of the enclosure. With the tape cassette so positioned, the button may be in either the recessed position 90, which occurs if the button is not in alignment with one of the drive holes of the bottom wall of the hub, or the locking position 92, if alignment is achieved therebetween. After the enclosure is closed, if the button is in the recessed position and the container is jarred or vibrated slightly, the vibration causes the reel to rotate and/or to move laterally. As the reel rotates, one of the drive holes will quickly move into alignment with the button. At this time the spring member, which is continuously urging the button upward, causes the button to move into its locking position with the drive hole. Consequently, further lateral and rotational movement of the reel is limited so as to prevent the tape from unwinding while the cassette is enclosed within the container.

In order the enhance locking engagement with the drive holes, the button 86 is substantially cylindrical in shape and has a slight taper near the top. The taper has been found to react to the side thrusts exerted by the reel during vibration in a manner which prevents the button from being forced under the top surface of the cap. It should be noted that tests were made with buttons which were fabricated with a substantially hemispherical shape. During these tests it was found that the curved sides of the hemispherically-shaped buttons provided insufficient engagement with the drive holes, and as a result, the buttons tended to slide under the cap when side thrusts were exerted by the reels. The button 86 is formed integrally with the leaf-spring 84 as part of the cap 34 from a resilient material, such as polypropylene. It should be recognized that the spring force exerted by the spring member 84 is proportional to the resiliency characteristic of the material and the length of the moment arm of the member. As seen in FIG. 5 the spring member extends along the diameter of the cap from a location near the periphery thereof, as illustrated by its axis 88. In this manner, the length of the moment arm of the spring is as long as is physically possible.

Another feature of the present invention is the inclusion of short thin flexible annularly-shaped cassette engaging members 94 around the bases 32. The diameter of each of the cassette engaging members 94 is substantially equal to or is slightly less than the diameter of the respective openings 70 in the wall of the cassette. The outer periphery of the cassette-engaging member 94 is serrated as at 96. Accordingly, when the cassette is positioned on the hub-engaging means, the serrations 96 engage corresponding portions of the wall defined by the circular openings, and serve to more completely restrict movement of the reel within the cassette and the cassette about the reels. In addition, the flexible serrations accommodate variations in the size of the circular openings.

In the preferred embodiment, the enclosure and the base of the hub-engaging means are formed as an integral unit with a plastic injection molding process. The same process is used to form the cap. Such injection molding processes are well known in the art, and it is not claimed that the process forms a part of the present invention. Preferably, the storage container is formed from polypropylene, although any plastic, including other members of the olefin family, may be used. In another embodiment, the cylindrical boss and the spring may be integrally formed and adapted to be mated with the enclosure. With respect to dimensions, when the enclosure is opened completely, its length is about 15 inches, its width about 10 inches, and the centerlines of the protruding bases are spaced apart by about 3.5 inches. The wall thickness of the polypropylene is about 0.90 inch. The cap is formed from a acetal material and has an outer diameter of 1.185 inches. The button is located at a radius of 0.390 inch and is 0.150 inch high.

In a test made on the storage container of the present invention, the container, with a tape cassette therein, was placed on a shaker table and vibrated vigorously in several different directions for about three and one-half hours. During the entire test, the button remained in engagement in a locking position with one of the drive holes, and consequently no tape was spilled off the storage or take-up reels.

From the above, it can be seen that an improved storage container for storing tape cassettes has been described which fulfills all of the objects and advantages set forth above.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A storage container for storing a tape cassette, said tape cassette including opposed first and second walls for housing a reel of magnetic tape such that said reel is laterally and rotatably movable therebetween, whereby lateral and rotational movement of said reel causes said tape to unwind, said reel comprising a hub which includes a bottom wall and a cylindrical side wall that define a cylindrical recess therewithin, said bottom wall including a central locating hole, for receiving a locating pin which protrudes inwardly from said second wall for roughly positioning said reel, and a plurality of drive holes disposed between said locating hole and said side wall, said first wall including a circular opening therethrough that exposes said recess, said container comprising:

enclosure means for enclosing said cassette, said enclosure means including a first wall having a flat, planar inner surface;

a cylindrical hub engaging means affixed to said inner surface and protruding inwardly therefrom for engaging portions of said bottom wall and said side wall of said hub, said hub engaging means including a spring-retaining recess beneath its top surface and having an outer diameter that is slightly less than that of said side wall and a height such that its top surface abuts said bottom wall when said first wall of said cassette is placed against said inner surface; and spring means that is carried by said hub engaging means and which includes a button, that is adapted to be received by said drive holes, and a spring member, said button being movable between a recessed position, wherein said button lies within said spring-retaining recess and a locking position, wherein said button extends above said top surface, said spring member urging said button into said locking position, whereby when said cassette is placed within said container and one of said drive holes is aligned with said button, said spring member urges said button into said locking position within said aligned drive hole, thereby to limit lateral and rotational movement of said reel so as to prevent said tape from unwinding while said cassette is enclosed within said container.

2. A storage container for storing a tape cassette as recited in claim 1 wherein said cassette includes a second hub that is identical to said first hub and wherein said first wall of said cassette includes a second circular opening for exposing a second cylindrical recess of said second hub, said container comprising a second cylindrical hub engaging means affixed to said inner surface and protruding inwardly therefrom at a location that is in alignment with said second cylindrical recess, and a second spring means for engaging one of said drive holes of said second hub.

3. A storage container for storing a tape cassette as recited in claim 2 wherein said spring means is formed as an integral assembly.

4. A storage container for storing a tape cassette as recited in claim 3 wherein said spring means is formed in said top surface of said hub engaging means.

5. A storage container for storing a tape cassette as recited in claim 4 wherein said hub engaging means and said spring means are formed from polypropylene.

6. A storage container for storing a tape cassette as recited in claim 4 wherein said buttons are tapered so that when said respective spring members are slightly recessed, the outer surface of said button remains in engagement with said drive hole, thereby to prevent side thrust of said reel from forcing said button under said top surface.

7. A storage container for storing a tape cassette as recited in claim 4 wherein said spring member extends along a diameter of said top surface from a location near the periphery thereof so as to form a long moment arm.

8. A storage container for storing a tape cassette as recited in claim 7 wherein said hub engaging means includes an annular base that is integrally formed with said inner surface, and a cap, said base including therewithin four apertured supports disposed near its inner periphery so as to define said spring-retaining recess therebetween, said cap comprising said spring means and including four elongated members which depend outwardly therefrom and which are located so as to be receivable by respective ones of said apertured supports, thereby to firmly secure said cap to said base.

9. A storage container for storing a tape cassette as recited in claim 2 and further comprising first and second short thin, annularly-shaped cassette engaging members that extend inwardly from said inner surface at locations radially outwardly of said respective first and second hub engaging means for engaging said respective first and second circular openings, thereby to more completely restrict movement of said reel within said cassette.

10. A storage container for storing a tape cassette as recited in claim 9 wherein the outer periphery of said first and second cassette engaging members is serrated to accomodate variations in the size of said first and second circular openings.

* * * * *